(12) United States Patent
Kurokawa

(10) Patent No.: US 6,556,787 B1
(45) Date of Patent: Apr. 29, 2003

(54) DISTANCE MEASURING APPARATUS AND FOCUSING DEVICE

(75) Inventor: Yoshiro Kurokawa, Chiba-ken (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 09/665,211

(22) Filed: Sep. 18, 2000

(30) Foreign Application Priority Data

Oct. 4, 1999 (JP) .......................................... 11-283213

(51) Int. Cl.[7] .............................................. G03B 13/36
(52) U.S. Cl. ....................................................... 396/96
(58) Field of Search ................... 396/96, 104; 348/297, 348/298, 299

(56) References Cited

U.S. PATENT DOCUMENTS 4,479,062 A * 10/1984 Kawasaki et al. .......... 348/298
4,544,848 A * 10/1985 Kawasaki et al. .......... 348/298
5,963,252 A * 10/1999 Iwasaki et al. ............. 348/298

* cited by examiner

Primary Examiner—W. B. Perkey
(74) Attorney, Agent, or Firm—Jordan and Hamburg LLP

(57) ABSTRACT

An object being distance-measured is detected of its status change by a simple structure.

A processing operating circuit 7 samples and stores outputs of a monitor cell 8 and compares between a value sampled in the last time and a value sampled in the present time. When a difference thereof is out of a predetermined range, it is determined that the state of a subject has changed due to movement or the like of the subject and the output of the monitor cell 8 has changed thus outputting a detection signal to a terminal D. A control-logic 12 causes a gate section 2 due to an input of the detection signal to forcibly end the storage operation of a line sensor section 1. Meanwhile, due to the detection signal outputted on the terminal D, an alarm section 14 gives alarm that the subject has moved.

3 Claims, 3 Drawing Sheets

DISTANCE MEASURING APPARATUS AND FOCUSING DEVICE

BACKGROUND OF THE INVENTION

1. Field of the Invention

The present invention relates to a distance measuring apparatus and a focusing device.

2. Description of Prior Arts

Conventionally, the cameras having a distance measuring apparatus for taking a still image as a photographic subject conducts exposure control of processing for focusing or the like, depending not upon a presence or absence of luminance change in a subject due to movement of the subject in distance measurement but on a result of distance measurement at that time.

Also, the distance measuring apparatuses employed in the cameras or the like include those for detecting a moving state of a subject as a photographic object. These operate to measure distances in plurality of times at a predetermined time interval to thereby detect subject movement based on a result of distance measurement. Furthermore, complicate exposure control operation is made in compliance with a moving subject.

However, in the former case, there encounters a problem that an accurate distance to a subject is not to be obtained where there is state change in the subject as an object due, for example, to movement of the subject during distance measurement or change in subject luminance or approach of other object to a vicinity of the subject. Also, there is another problem that accurate focusing is impossible to perform by utilizing those measurement results.

The latter requires repeated operations of measurements, resulting in a problem that distance measurement takes long time with increased power consumption. Furthermore, complicated processing is required, i.e. distance measurement is repeatedly made to compare between the results thereof.

SUMMARY OF THE INVENTION

A distance measuring apparatus of the present invention comprising: a monitor element for generating an output depending on an intensity of light of an object; a charge-storage type light receiving element formed by a plurality of pixels for receiving the light of the object; a control circuit for controlling storage operation of the charge-storage type light receiving element depending on the output of the monitor element; a distance detecting circuit for detecting a distance to the object by a photoelectric output of the charge-storage type light receiving element; and a detection-signal output circuit for outputting a detection signal when there is change in output of the monitor element during storage operation of the charge-storage type light receiving element. Accordingly, the utilization of a detection signal makes it possible to confirm on a state that a distance to an object is not correctly obtained. Also, the structure can be simplified because the output of the monitor element required for controlling storage operation of the charge-storage type light-receiving element is used in status change determination of the object during distance measurement operation.

If the detection signal is to prohibit the storage operation or to issue an alarm or to determine that the object has moved, it is possible to prevent from outputting a distance measurement result low in reliability or to recognize a user that a distance measurement result is low in reliability. Also, it is possible to make unnecessary repeated distance measurement operations when detecting a movement of the object. Accordingly, moving object detection can be made in a brief time, reducing power consumption. Also, in the conventional, object movement could not have been detected during distance measurement operation because of detection of subject movement from a distance measurement result. However, in the present invention, subject movement can be detected even during distance measuring operation thus reducing the detection time and power consumption. Also, complicate processing of performing repeated distance measuring operations and comparison of the results thereof can be made unnecessary.

Included are the distance measuring apparatus and focusing section for performing focusing of a lens based on a detected distance to the object by the distance measuring apparatus. Accordingly, a similar effect to the above is provided. Further, the accuracy of focusing is improved because of prevention from focusing based on a distance measuring result low in reliability and of recognizing a user that focusing is low in reliability.

DETAILED DESCRIPTION OF THE PREFERRED EMBODIMENT

Figure 1:
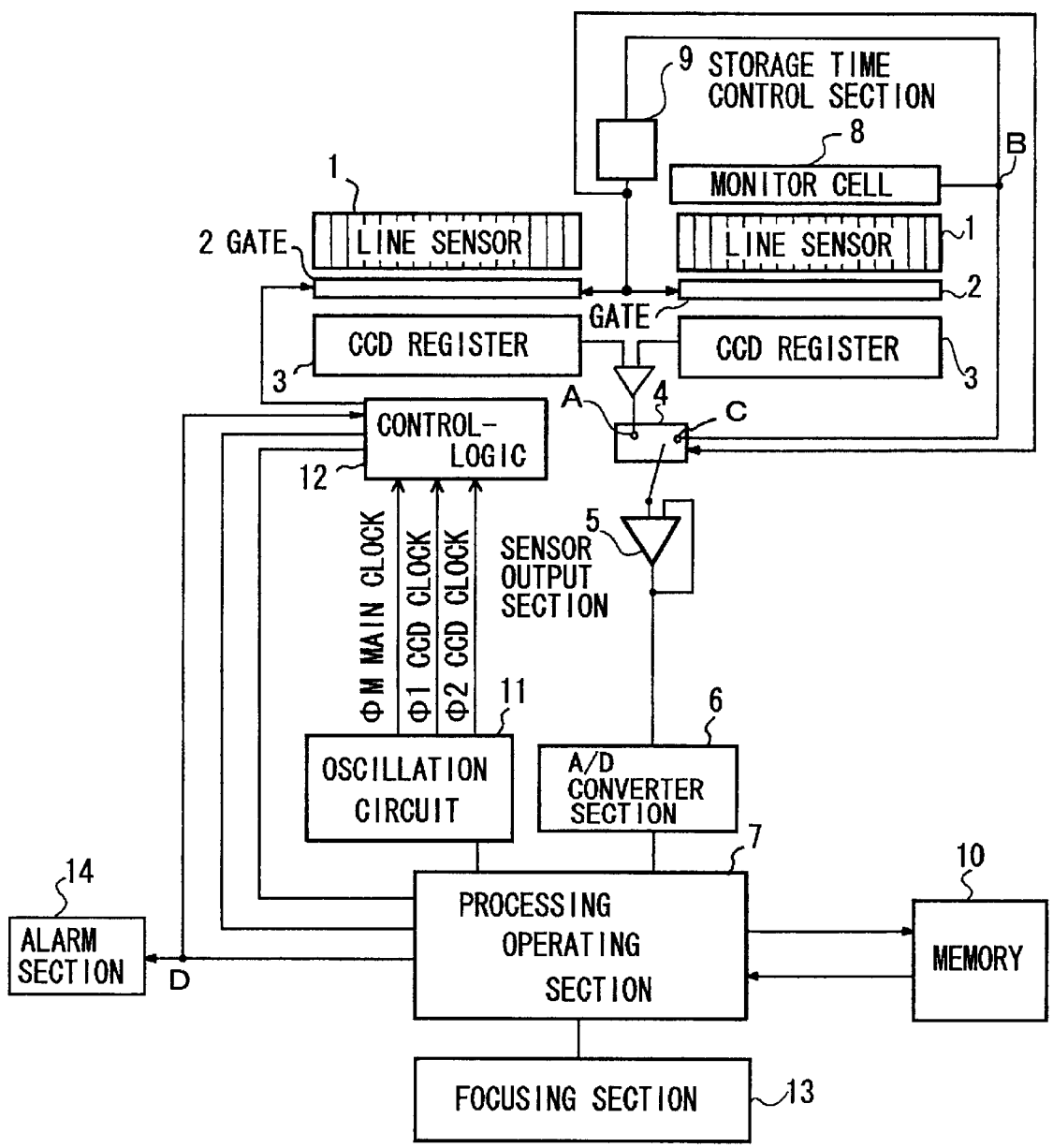
FIG. 1 is a circuit diagram showing one embodiment of the present invention.

Hereunder, the present invention will be explained based on one embodiment shown in the drawings. In FIG. 1, a charge-storing type light receiving device (hereafter, referred to as "line sensor section") 1 comprises a pair of photoelectric-conversion line sensors or the like including a plurality of pixels to generate electric charges by receiving the light of an image of a subject to be distance-measured through a focusing optical system such as a lens (not shown). The line sensor section 1 uses, for example, a CCD.

The pixels of the line sensor section 1 are controlled in storing charges by the operation of a gate section 2. When the gate section 2 is opened and completes charge storing, the pixel outputs of the line sensor section 1 are transferred to a CCD shift register 3 (hereafter, referred to as "CCD register"), and then sequentially serially outputted to an outside through a terminal A. This output is inputted to an A/D converter section 6 through a switch section 4 and sensor output section 5. The A/D converter section 6 converts the input pixel output of the line sensor section 1 into a digital value and outputs it to a processing operating section 7. The processing operating section 7 operates a distance to the subject based on the digitally-converted outputs of the line sensor section 1. The method of operating a distance to the subject is conducted by performing known so-called correlation operation. Accordingly, the operating method is omitted of explanation. The processing operating section 7 constitutes a distance detecting circuit and a detection signal output circuit.

A monitor cell 8 as a monitor element is provided closed to the line sensor section 1 and generates onto a terminal B a monitor output in proportion to an average amount of light incident on the line sensor section 1. For example, a photoelectric converting element is used as the monitor cell 8. A storage time control section 9 integrates the monitor output, and outputs to the gate section 2 a storage operation end signal when an integration value exceeds a predetermined value. Meanwhile, by inputting the monitor output caused on the terminal B from the terminal C to the processing operating section 7 through the switch section 4, sensor output section 5 and A/D converter section 6 and processing the monitor output by the processing section 7, the amount of light to be incident on the monitor cell 8 can be confirmed.

A memory 10 operates in cooperation with the processing operating section 7. An oscillating circuit 11 outputs to the control-logic 12 a main clock φM and CCD clock φ1, φ2 or the like for operating the CCD register 3. The control-logic 12 controls the operation of the CCD register 3 or the like based on these signals.

A focusing section 13 performs focusing operation of a lens (not shown) based on a distance to a subject outputted from the processing operating section 7. An alarming section 14 issues an alarm under control of the operation processing section 7.

Next, the outline of operation will be explained with reference to FIGS. 2A–2E. Incidentally, in FIGS. 2A, 2C and 2E of the same figure the regions surrounded by [ ] x are regions to be measured of a distance and in FIGS. 2B, 2D and 2F represent graphs of integrating the output of the monitor cell 8 based on the light from the region x to be distance-measured in the same FIGS. 2A, 2C and 2E during storage operation.

Figure 2:
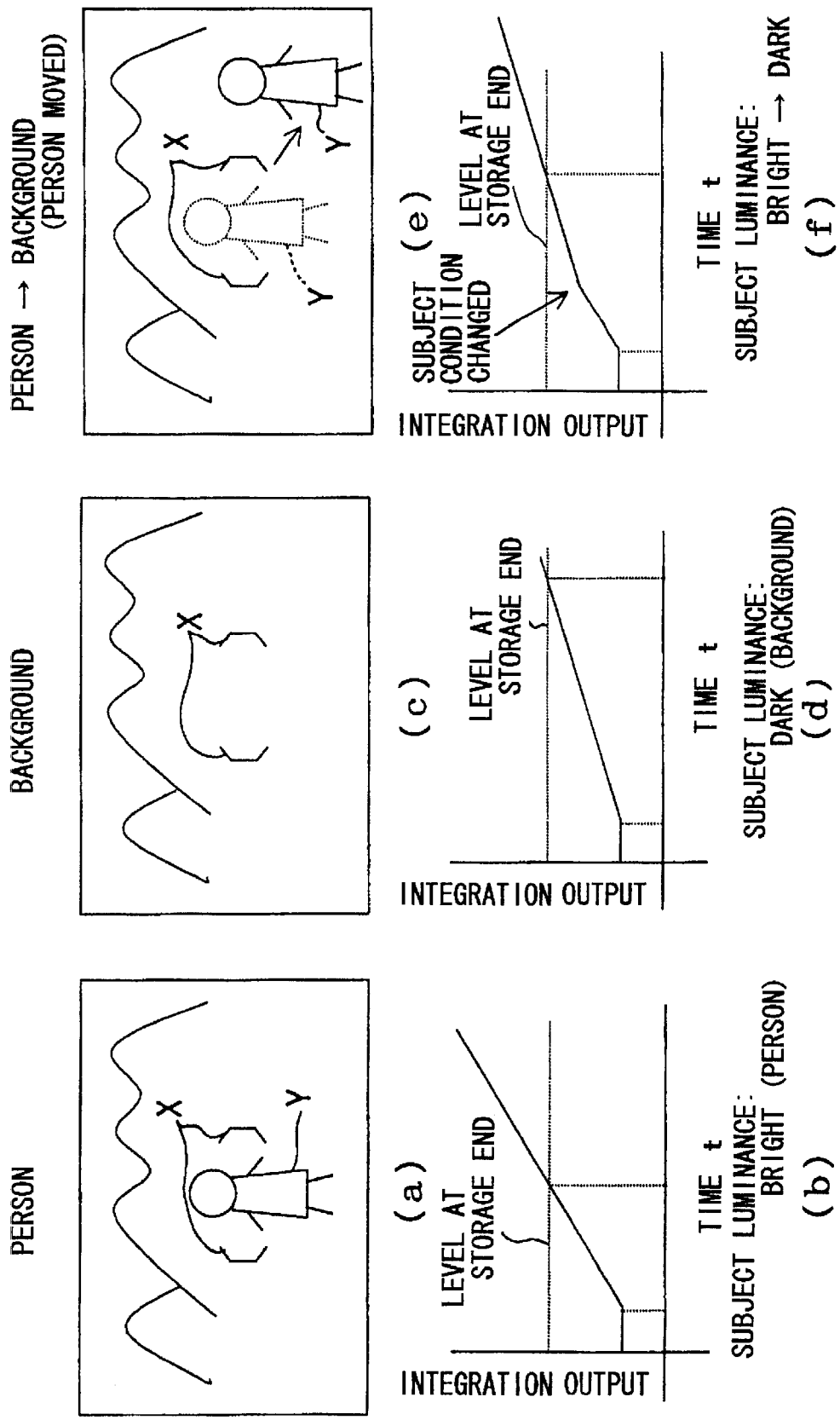
FIG. 2 is an explanatory view for explaining the outline of operation of FIG. 1.

Comparing FIGS. 2A and 2C, in FIG. 2A a person Y exists in the region x to be distance-measured whereas in FIG. 2C there is no person Y but only so-called a background in the region x to be distance-measured. Accordingly, when integrating photoelectric currents based on the light, there is change rate with respect to an integration output time as shown in FIGS. 2B and 2D. This is due to a difference in magnitude of photoelectric current.

Consequently, if the person Y moves during coupling an subject image to the line sensor section 1 and monitor cell 8 as in FIG. 2E thus resulting in change in luminance of the subject, the output of the monitor cell 8 changes to change the change ratio with respect to an integration time output thereof.

This example detects an output change of the monitor cell 8 during charge string operation, thereby detecting a status change of the subject.

Figure 3:
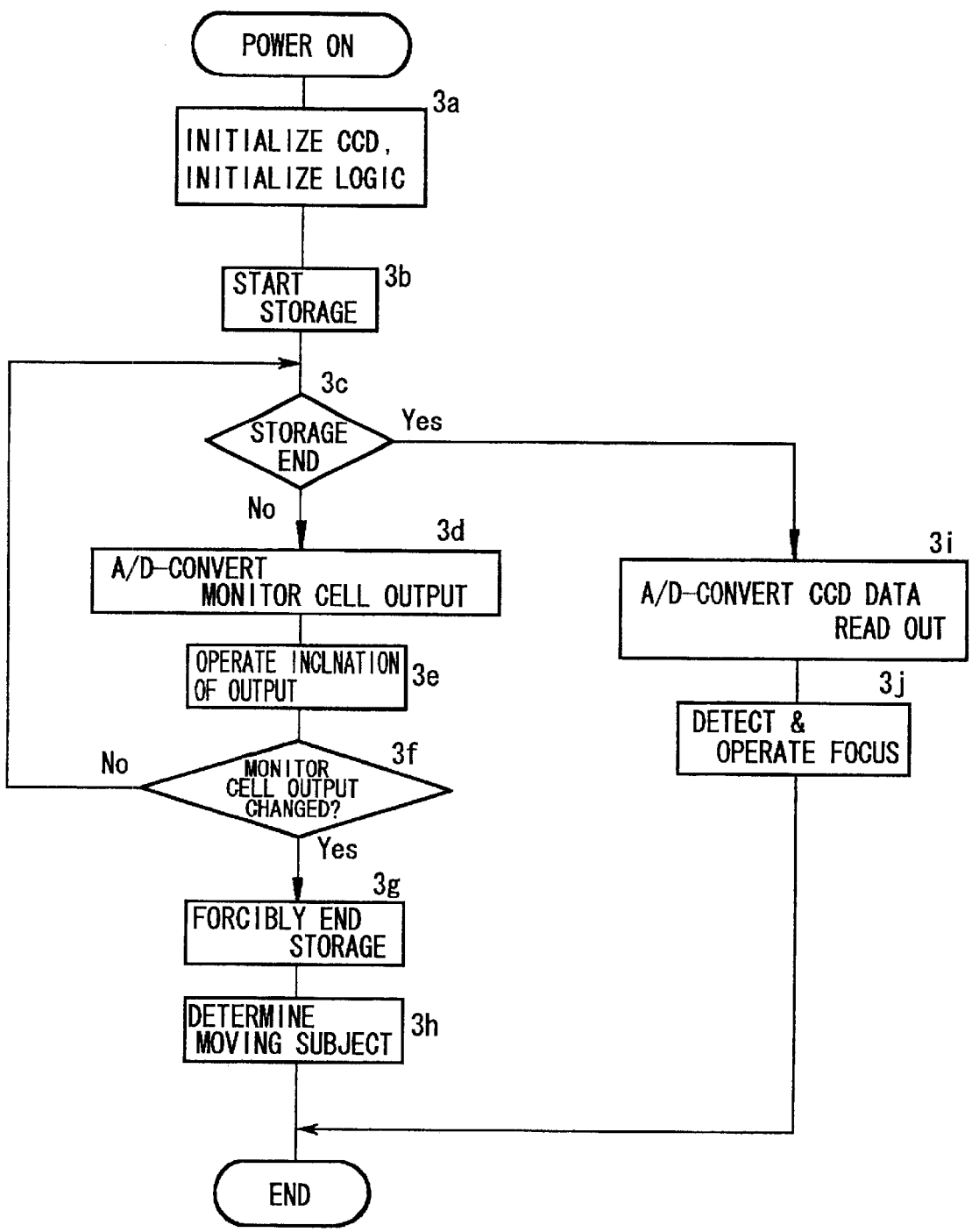
FIG. 3 is a flowchart for explaining operation of FIG. 1.

Next, concrete operation will be explained with reference to FIG. 3.

When power is turned on, the CCD register 3, the processing operating section 7, the storage time control section 9 and the control-logic 12 are initialized and the switch section 4 is connected to a terminal C (step 3a).

After ending the initialization, charge storing operation in the line sensor section 1 is started under control of the control-logic 12 or the like (step 3b).

In this state, if the charge storage time control section 9 does not output a storage-operation end signal (step 3c), a monitor output of the monitor cell 8 is inputted through the sensor output section 5 to the A/D converter section 6 where it is A/D-converted and inputted to the processing operating section 7 (step 3d).

The processing operating circuit 7 samples and stores the monitor output converted into a digital value, and compares between a value sampled in the last time and a value sampled in the present time to compare whether a difference thereof is in a predetermined range, i.e. operates a change in inclination of the monitor output (step 3e). Incidentally, the operation of the step 3e ends only with storing a sampled value where there is a value at a first operation after initialization due to turning on the power, i.e. in the last time.

As a result of the step 3e, when a difference between the value sampled in the last time and the value sampled in the present time is in the predetermined range, it is determined that there is no change in output of the monitor cell 8 and no change in status of the subject, returning to the step 3c to perform operation similarly to the above (step 3f).

As a result of the step 3e, when the difference between the value sampled in the last time and the value sampled in the present time is out of the predetermined range, the processing operating section 7 determines that the subject status has changed and the output of the monitor cell 8 has changed, thus outputting a detection signal to a terminal D. The control-logic 12 causes the gate section 2 to operate by an input of the detection signal and forcibly ends the storage operation of the line sensor section 1 (step 3g).

Also, by the detection signal outputted to the terminal D, the alarming section 14 gives an alarm that the subject has moved is determined (step 3h).

In this manner, when there is change in the output of the monitor cell 8 during storage operation of the line sensor section 1, it is determined that the subject (object) has changed in its status, outputting a detection signal. Accordingly, by utilizing the detection signal, it is possible to confirm a status that a correct distance to an object is not to be obtained. Also, because the output of the monitor cell 8 required to control the storage operation of the line sensor section 1 is used also for status change determination of object light, the structure can be simplified.

When the object is changed in status, storage operation is prohibited, an alarm signal is issued or object has moved is determined. Accordingly, it is possible to prevent against outputting a less-reliable measurement result or recognize the user that measurement result is low in reliability. Also, the conventionally-required repetition of distance-measurement operations can be made unnecessary in detecting a movement of an object. Accordingly, a moving object can be detected in a brief time thus reducing power consumption. Also, in the conventional, subject movement is detected from a distance-measurement result and hence the subject movement cannot be detected during distance-measurement operation. The present invention, however, can detect a movement of a subject even during distance-measurement operation and hence reduce detection time and power consumption. Also, it is possible to make unnecessary complicated processing of repeatedly performing distance-measurement operations and comparing between results thereof.

Returning back to FIG. 3, if a storage-operation end signal is outputted from the storage-time control section 9 without detecting a subject status change even by repeating the step 3c to step 3f, the gate section 2 operates to shift the storage charge of the line sensor section 1 to the CCD register 3, ending storage operation. The switch section 4 is switched to connect the terminal A.

The storage charge shifted to the CCD register 3 is sequentially serially transferred to the terminal A by CCD clocks φ1, φ2 and the like from the control-logic 12 and outputted through the sensor output section 5 to the A/D converter section 6 where it is converted into a digital value and outputted to the processing operating section 7 (step 3i).

The processing operating section 7 operates a distance to the subject based on each of the digitally-converted pixel outputs of the line sensor section 1 (step 3j).

The focusing section 13 performs focusing of the lens (not shown) based on the distance to the subject outputted from the processing operating section 7.

In this manner, the accuracy of focusing can be improved because of preventing from being focused based on a measurement result with reliability reduced due to subject status change or of recognizing the user that the reliability of focusing is low.

The distance measuring apparatus of the present invention includes a detection-signal output circuit to output a detection signal when there is an output change of the monitor element during storage operation of the charge storage type light receiving element. Accordingly, by utilizing the detection signal, confirmation is possible on a state that an accurate distance to an object cannot be obtained. Also, because the output of the monitor element required for controlling storage operation of the charge-storage type light receiving element is used also for status change detection of the object, the structure can be simplified.

If the detection signal is to prohibit the storage operation or to issue an alarm or to determine that the object has moved, it is possible to prevent from outputting a distance measurement result to be low in reliability or to recognize a user that a distance measurement result is low in reliability. Also, it is possible to make unnecessary repeated distance measurement operations when detecting a movement of the object. Accordingly, moving object detection can be made in a brief time, reducing power consumption. Also, in the conventional, object movement could not have been detected during distance measurement operation because of detection of subject movement from a distance measurement result. However, in the present invention, subject movement can be detected even during distance measuring operation thus reducing the detection time and power consumption. Also, complicate processing of performing repeated distance measuring operations and comparison of the results thereof can be made unnecessary.

According to the focusing device including a focusing section to perform focusing based on a distance detected by the distance measuring apparatus, a similar effect to the above can be provided. Further, it is possible to prevent focusing operation based on a low-reliable measurement result or to recognize a user that focusing is low in reliability. Thus, the accuracy of focusing is improved.

What is claimed is:

1. A distance measuring apparatus comprising:
    a monitor element for generating an output depending on an intensity of light of an object;
    a charge-storage type light receiving element formed by a plurality of pixels for receiving the light of the object;
    a control circuit for controlling storage operation of said charge-storage type light receiving element depending on the output of said monitor element;
    a distance detecting circuit for detecting a distance to said object by a photoelectric output of said charge-storage type light receiving element; and
    a detection-signal output circuit for outputting a detection signal when there is change in output of said monitor element during storage operation of said charge-storage type light receiving element.

2. A distance measuring apparatus according to claim 1, wherein the detection signal is to prohibit the storage operation or to issue an alarm or to determine that said object has moved.

3. A distance measuring apparatus according to claim 1 or 2, including a distance measuring apparatus of claim 1 or 2 and a focusing section for performing focusing of a lens based on a detected distance to said object by said distance measuring apparatus.

* * * * *